A. ALBERTSON.
Assignor, by mesne assignments, to himself, S. B. HUNT & F. E. PINTO.
Method of, and Apparatus for, Manufacturing Ice.
No. 8,455. Reissued Oct. 15, 1878.
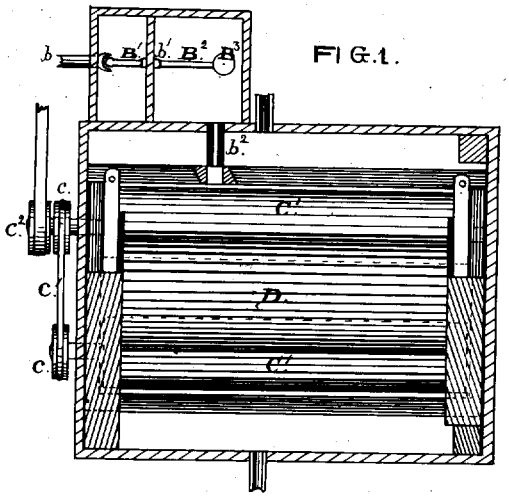
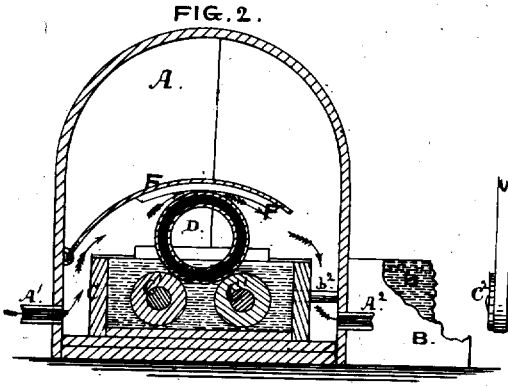
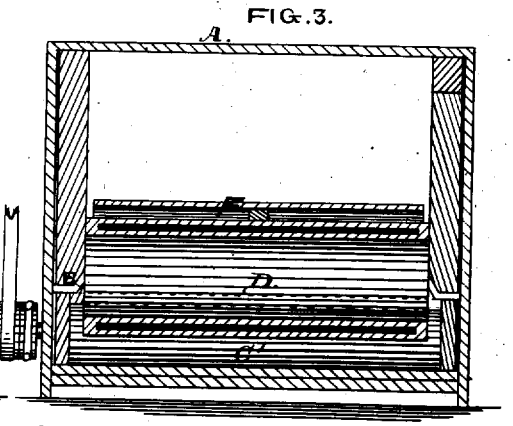
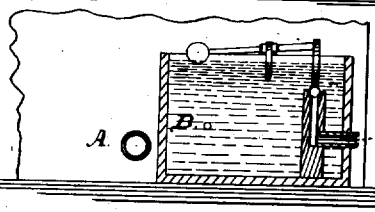
Witnesses:
James P. McLean
John R. McLean
Inventor:
Albert Albertson

UNITED STATES PATENT OFFICE.

ALBERT ALBERTSON, OF JERSEY CITY, NEW JERSEY, ASSIGNOR, BY MESNE ASSIGNMENTS, TO HIMSELF, SIMON B. HUNT, AND FRANCIS E. PINTO.

IMPROVEMENT IN METHODS OF AND APPARATUS FOR MANUFACTURING ICE.

Specification forming part of Letters Patent No. 115,409, dated May 30, 1871; Reissue No. 8,455, dated October 15, 1878; application filed September 25, 1878.

*To all whom it may concern:*

Be it known that I, ALBERT ALBERTSON, of Jersey City, in the county of Hudson and State of New Jersey, have invented certain Improvements in the Method of Freezing Water; and I do hereby declare that the following is a full, clear, and exact description thereof, reference being had to the annexed drawings, making part of this specification, in which—

Figure 1 represents a sectional plan of so much of an apparatus for freezing water as is necessary to illustrate my invention. Fig 2 is a vertical transverse section thereof; Fig. 3, a vertical longitudinal section through the center. Fig. 4 is a vertical section of the feed-water tank.

The same letters of reference are used in all the figures in the designation of identical parts.

The object of this invention is to freeze water into blocks of ice of any desirable form in a more rapid manner than is possible by the use of the ordinary tanks, in which the still body of water is frozen from the surface; and my improvement consists in freezing water upon the outer surface of a cylindrical or other revolving core of any suitable form, that may be alternately immersed under and again lifted out of the water, to expose the thin film of water upon the surface of said revolving core, or that of the ice already formed upon it, to a current of cold atmospheric air discharged from an air-forcing device conveniently located outside of chamber A, and operated by any suitable engine to force a continuous supply of cold air under pressure and at a low temperature through the pipe $A^1$ onto the revolving core D, Fig. 2, to freeze the water upon the same. The process is continued until a jacket of pure ice is formed around the core D of any required thickness, when it is removed in the manner hereinafter explained.

The improvement further consists in several novel features of construction and arrangement of the apparatus shown, to be generally set forth in the following description, and specifically pointed out in the claims.

In the annexed drawing, A represents the freezing-chamber of an ice-machine, into which the cold air passes through the pipe $A^1$, and from which it issues after it has been utilized through the exhaust-pipe $A^2$ upon the opposite side.

The chamber is constructed with double or multiple walls, packed with any suitable non-conducting material, to prevent the external atmosphere from affecting the temperature of the interior of chamber, which is filled with air from the air-forcing device. Upon one side of this chamber is built a reservoir, B, which is charged with water from any convenient source through a pipe, *b*, the end of which issuing into the reservoir is controlled by a valve, $B^1$. To the stem of this valve is attached a lever, $B^2$, pivoted at $b^1$, and provided at the end of its long arm with a float, $B^3$, which, when the water is at the proper level in the reservoir, is borne up so as to seat the valve and stop the flow of the water into the reservoir until the water therein falling permits the valve to open again. In this manner the water in the reservoir will always stand at a uniform height. Other means than those described to effect this result may be employed.

The water flows from the reservoir B through a pipe, $b^2$, into a tank, C, of which there may be any number, arranged in the freezing-chamber A.

In the example illustrated the ice is to be formed around a cylindrical revolving core, D, which is placed upon and between two rollers, C′ C′, so as to have a portion of its surface immersed in the water in the tank C. The rollers C′ are journaled in the end walls of the tank in any suitable manner, so as to form a water-tight joint therewith, and at one end the journals extend beyond the tank and pass through the wall of the freezing-chamber. Each carries on its overhung journal a pulley, *c*, which pulleys are connected by a belt, $c^1$, so as to revolve in the same direction when power is applied at the driving-pulley $c^2$ upon one of the journals. The core D fits snugly between the knives or scrapers E, one of which is mounted on each end of the tank, presenting its sharp edge upward. These knives serve to scrape off the ice as fast as it forms on the ends of the core.

The friction of the revolving rollers C′ upon the core D will cause it to revolve, also, continuously, so as to expose its surface, after leaving the water, covered by a thin sheet or film thereof, to the action of the incoming cold air, which will immediately freeze it. The core is left on the rollers until the ice upon it has obtained the desired thickness, when it is taken out and drawn out of the ice in the following manner: The shell of the core is made hollow, and contains at one end a nozzle or a tap, to which to attach a steam-pipe and induct steam into the annular chamber. The walls will very soon be heated, so as to melt a thin sheet of the ice attached to its outer surface, and the core may readily be drawn out of the block of ice, it being not surrounded or covered at the ends.

F is a deflector, hinged to the side of the freezing-chamber at which the cold air enters. A rib, F′, is formed on its under side, by which it is supported upon the core D. It is used to direct the incoming cold air directly against the core, by which it is raised, as its diameter augments by the formation of ice upon its surface.

I wish it to be understood that I do not confine myself to the particular means herein described for forming ice upon a core, as these means may be varied in many ways without departing from the principle of my invention.

What I claim as my invention, and desire to secure by Letters Patent, is—

1. The herein-described method of forming ice in layers, which consists in freezing the water upon a revolving surface by forcing a current of atmospheric air at a low temperature against said surface, upon which the water is taken up in successive films, substantially as above set forth.

2. The combination of the water-tank C, revolving rollers C′ C′, and core D, constructed with hollow walls, all arranged in a freezing-chamber, to operate substantially as set forth.

3. The combination of the revolving hollow core D and scrapers E upon the ends of the water-tank C, substantially as and for the purpose set forth.

4. The combination of the revolving hollow core D and deflector F, arranged to operate substantially as set forth.

In testimony whereof I have signed my name to this specification in the presence of two subscribing witnesses.

ALBERT ALBERTSON.

Witnesses:
JAMES P. MCLEAN,
E. I. BALDWIN.